US011326327B2

(12) United States Patent
Yu et al.

(10) Patent No.: US 11,326,327 B2
(45) Date of Patent: May 10, 2022

(54) ATMOSPHERIC WATER HARVESTING SYSTEM

(71) Applicant: BOARD OF REGENTS, THE UNIVERSITY OF TEXAS SYSTEM, Austin, TX (US)

(72) Inventors: Guihua Yu, Austin, TX (US); Fei Zhao, Austin, TX (US); Xingyi Zhou, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 16/484,848

(22) PCT Filed: Feb. 9, 2018

(86) PCT No.: PCT/US2018/017532
§ 371 (c)(1),
(2) Date: Aug. 9, 2019

(87) PCT Pub. No.: WO2018/148482
PCT Pub. Date: Aug. 16, 2018

(65) Prior Publication Data
US 2020/0056355 A1 Feb. 20, 2020

Related U.S. Application Data

(60) Provisional application No. 62/456,853, filed on Feb. 9, 2017.

(51) Int. Cl.
*E03B 3/28* (2006.01)
*B01D 5/00* (2006.01)
(Continued)

(52) U.S. Cl.
CPC ............... *E03B 3/28* (2013.01); *B01D 5/006* (2013.01); *B01D 53/261* (2013.01); *B01D 53/28* (2013.01);
(Continued)

(58) Field of Classification Search
CPC ......... E03B 3/28; B01D 5/006; B01D 53/261; B01D 53/28; B01D 2253/202; B01D 5/00;
(Continued)

(56) References Cited

U.S. PATENT DOCUMENTS

2008/0160559 A1   7/2008  Carre et al.
2011/0177987 A1*  7/2011  Lenting .................. D06M 15/53
                                                                508/204

(Continued)

FOREIGN PATENT DOCUMENTS

DE       102010047788           4/2012
JP         2017-15321            1/2017
WO    WO-2016068129 A1 *    5/2016   ........ B01J 20/28011

OTHER PUBLICATIONS

International Search Report and Written Opinion dated May 4, 2018, from International Application No. PCT/US2018/017532, 9 pages.

(Continued)

*Primary Examiner* — Andrew J. Oyer
(74) *Attorney, Agent, or Firm* — Meunier Carlin & Curfman LLC

(57) ABSTRACT

Disclosed herein are water harvesting networks. The harvesters allow extraction and collection of moisture from the atmosphere without requiring electrical energy inputs.

18 Claims, 6 Drawing Sheets

(51) Int. Cl.
  *B01D 53/26* (2006.01)
  *B01D 53/28* (2006.01)
  *B01J 20/26* (2006.01)

(52) U.S. Cl.
  CPC ....... *B01J 20/265* (2013.01); *B01D 2253/202* (2013.01)

(58) Field of Classification Search
  CPC ...... B01J 20/265; Y02A 20/00; Y02A 20/212; C02F 1/14
  See application file for complete search history.

(56) References Cited

U.S. PATENT DOCUMENTS

| | | |
|---|---|---|
| 2011/0303531 A1 | 12/2011 | Hunter et al. |
| 2015/0020687 A1 | 1/2015 | Alkhazraji et al. |
| 2017/0276380 A1* | 9/2017 | Sakikawa ............ B01D 53/263 |

OTHER PUBLICATIONS

Kohno et al. "Thermoresponsive polyelectrolytes derived from ionic liquids", Polymer Chemistry, Jan. 7, 2015, vol. 6, pp. 2163-2178.
Extended European Search Report dated Jun. 18, 2020, from related EP Application No. 18751943, 28 pages.
Gandhi, Arijit, et al. "Studies on thermoresponsive polymers: Phase behaviour, drug delivery and biomedical applications." asian journal of pharmaceutical sciences 10.2 (2015): 99-107.
Ma, M., Guo, L., Anderson, D. G., & Langer, R. Science, 2013, 339(6116), 186-189.
Ostwal, M. M., Sahimi, M., & Tsotsis, T. T. Physical Review E, 2009, 79(6), 061801.
Shi, Y., Ma, C., Peng, L., & Yu, G. Advanced Functional Materials, 2015, 25(8), 1219-1225.
Zheng, Y., Bai, H., Huang, Z., Tian, X., Nie, F. Q., Zhao, Y., Jiang, L. Nature, 2010, 463(7281), 640-643.

* cited by examiner

ATMOSPHERIC WATER HARVESTING SYSTEM

CROSS-REFERENCE TO RELATED APPLICATION

This application claims the benefit of U.S. Provisional Application 62/456,853, filed on Feb. 9, 2017, the contents of which are hereby incorporated in their entirety.

STATEMENT OF GOVERNMENT SUPPORT

This invention was made with government support under Grant no. CMMI1537894 awarded by the National Science Foundation. The government has certain rights in the invention.

FIELD OF THE INVENTION

The invention is directed to materials and methods for efficiently extracting potable water from atmospheric moisture.

BACKGROUND

Providing potable water to the world's population remains one of the greatest challenges of our time. It is estimated that over one billion people in the world lack sufficient access to water, and close to 2.7 billion people find access to water scarce. The problem is especially frustrating as water covers over 70% of the earth's surface. However, of all the world's water, only 3% is fresh water; the remainder is non-potable salt water. Furthermore, two-thirds of fresh water supplies is inaccessible, as it is locked away in glaciers. There have been numerous attempts to convert ocean water to drinking water. Systems include reverse osmosis and solar desalinization. However, these solutions are only practical in coastal environments. Many of the world's water-starved regions are far inland, away from the oceans. Strategies other than desalinization have also been explored, for instance moisture extraction from the air. Conventional atmospheric moisture harvesting devices include condensing and cooling devices. However, these devices can be difficult and expensive to operate, and typically require electrical inputs to function. Such devices are not ideal for many of the most water-starved regions. Moreover, many moisture harvesters only function well in high humidity environments. Many regions lacking water security, however, are arid and dry throughout the year. More recently, researchers have explored hydrogels and various polymers to extract water from the air. However, while many materials that readily absorb moisture are known, substantially less common are those materials that will also readily release the absorbed water. Thermodynamically, a material that absorbs water under particular conditions will not release water under the same conditions without an additional energy input. Conductive hydrogels have been proposed that absorb/release moisture depending on the charge applied to the system. However, like conventional condensers, such systems require external electrical inputs.

There remains a need for water harvesters capable of efficiently extracting moisture from the atmosphere, even in low humidity environments. There remains a need for water harvesters that do not include a complex array of engineered parts, and that are operable without electrical energy inputs.

SUMMARY

Disclosed herein are compositions and methods which address one or more of the foregoing needs. In particular are disclosed water harvesting polymer networks capable of absorbing atmospheric moisture, including in low humidity conditions. Also disclosed are water harvesting polymer networks capable of absorbing and release moisture without electrical energy inputs. The water harvesting polymer networks can include one or more thermoresponsive water storage polymers, permitting operation using solar energy.

The details of one or more embodiments are set forth in the descriptions below. Other features, objects, and advantages will be apparent from the description and from the claims.

DETAILED DESCRIPTION

Figure 1:
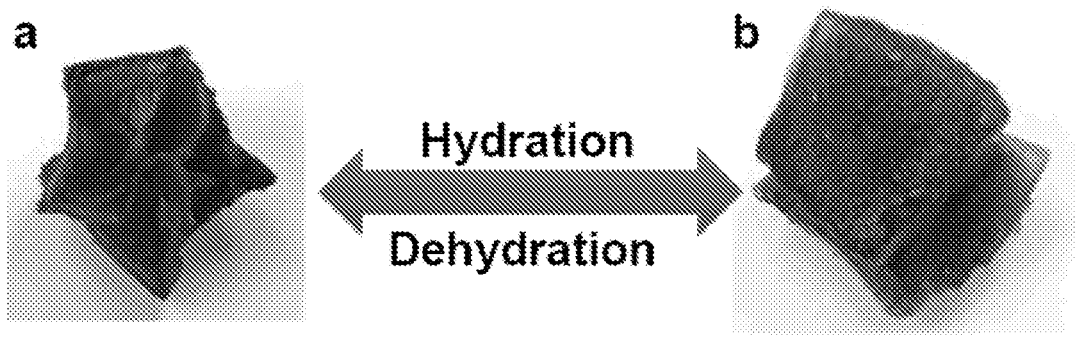
FIG. 1 includes a depiction of the harvester system prepared in Example 1 in the dehydrated and hydrated states.
Figure 2:
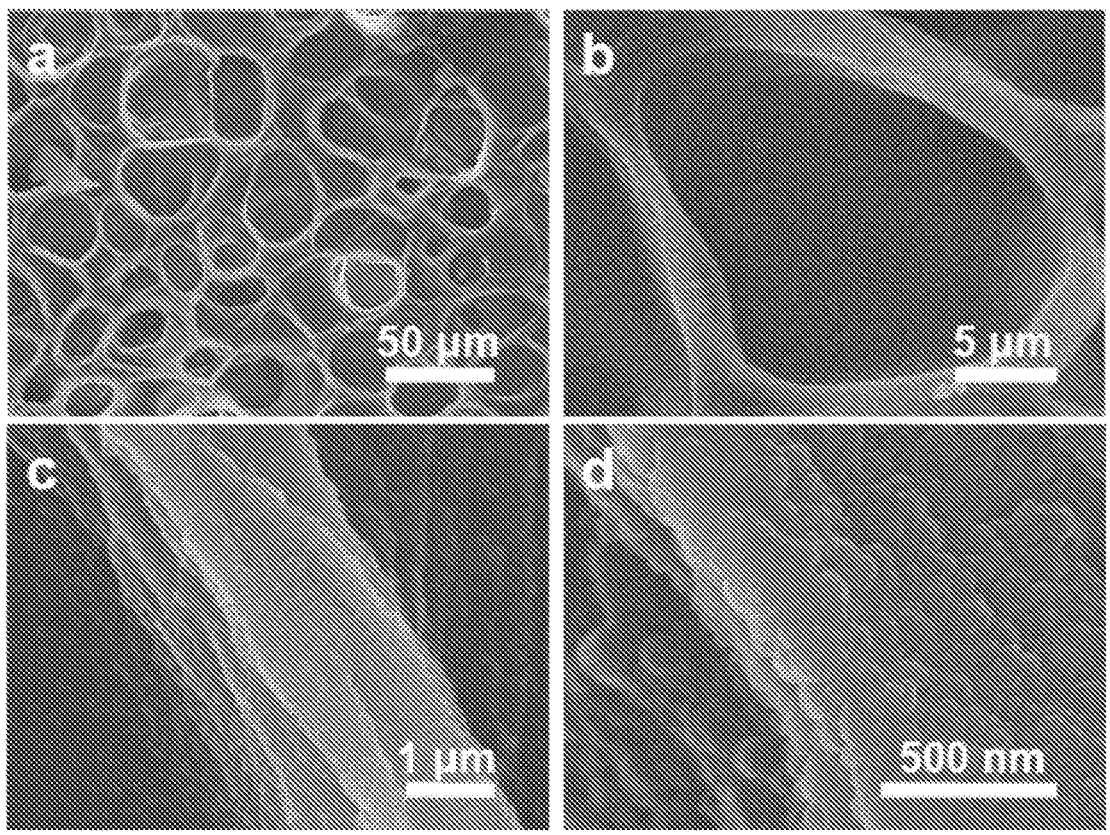
FIG. 2 includes a depiction of SEM images of the harvester system prepared in Example 1 in dehydrated form.
Figure 3:
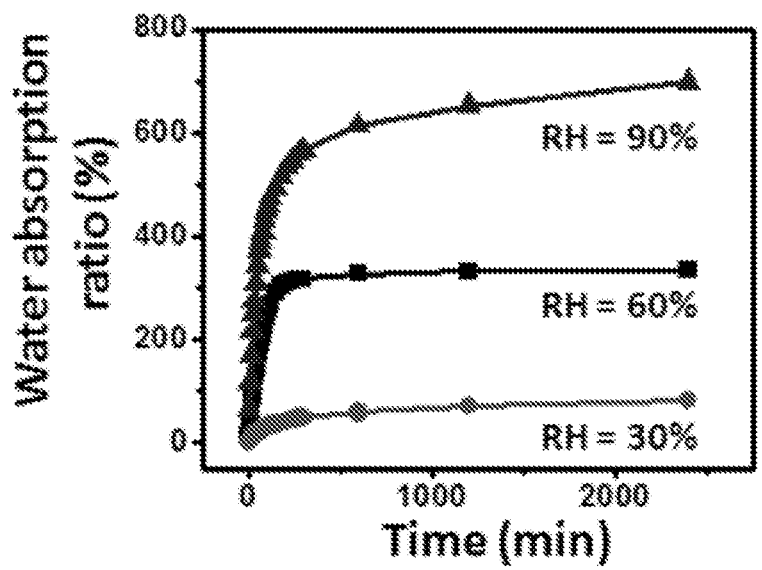
FIG. 3 includes a depiction of the moisture absorption of the harvester system prepared in Example 1 at different humidity levels (mass of absorbed water relative to weight of the network).
Figure 4:
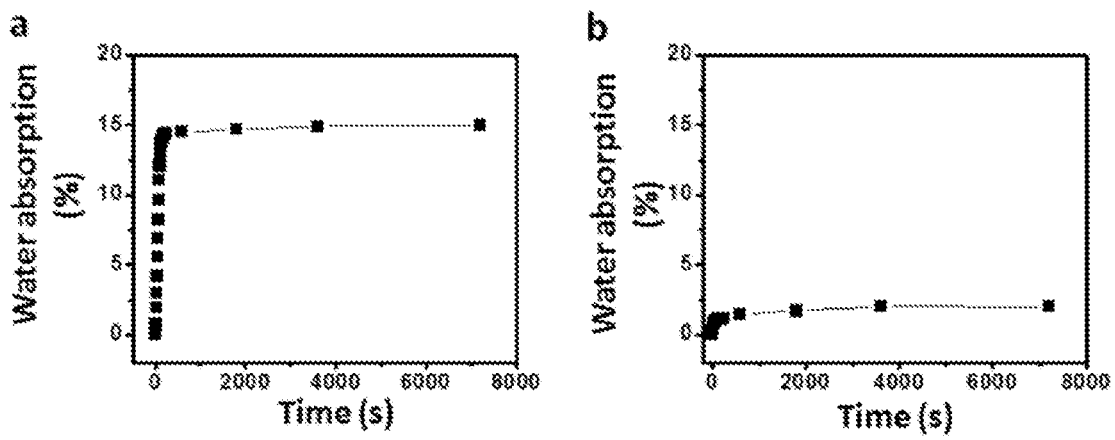
FIG. 4 includes a depiction of the moisture absorption of a chloride-doped polypyrrole (FIG. 4A) and poly-N-isopropylacrylamide (FIG. 4B) at 60% RH.
Figure 5:
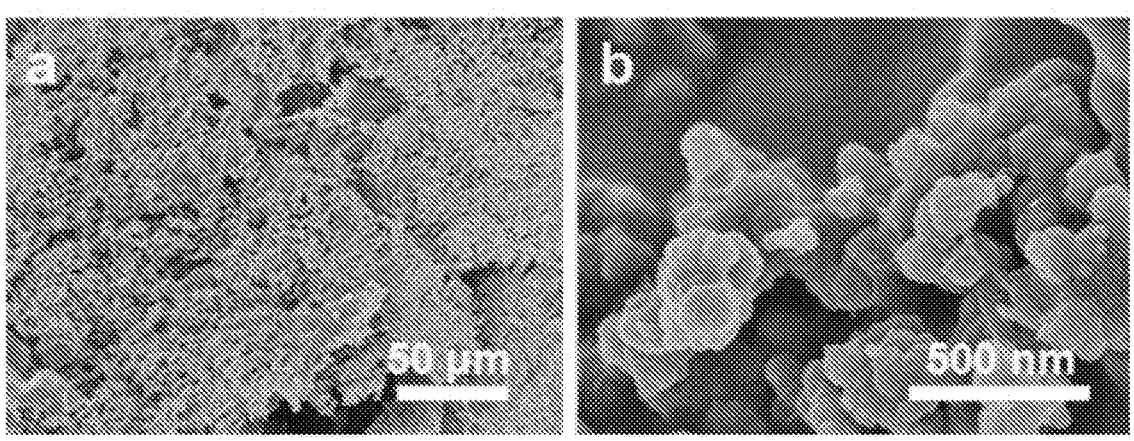
FIG. 5 includes a depiction of SEM images of a sample prepared by mixing pre-formed polypyrrole and poly(N-isopropyl)acrylamide.
Figure 6:
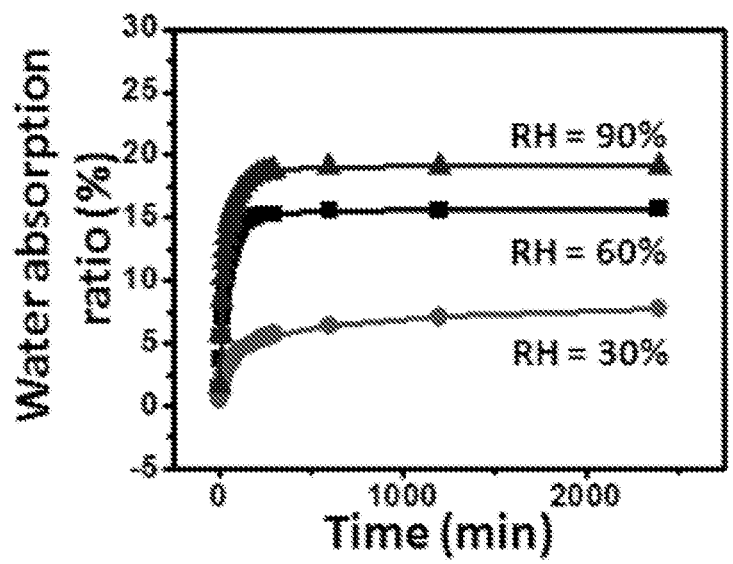
FIG. 6 includes a depiction of the moisture absorption the harvester system prepared in Example 1 at different humidity levels (mass of absorbed water relative to weight of the harvester system).
Figure 7:
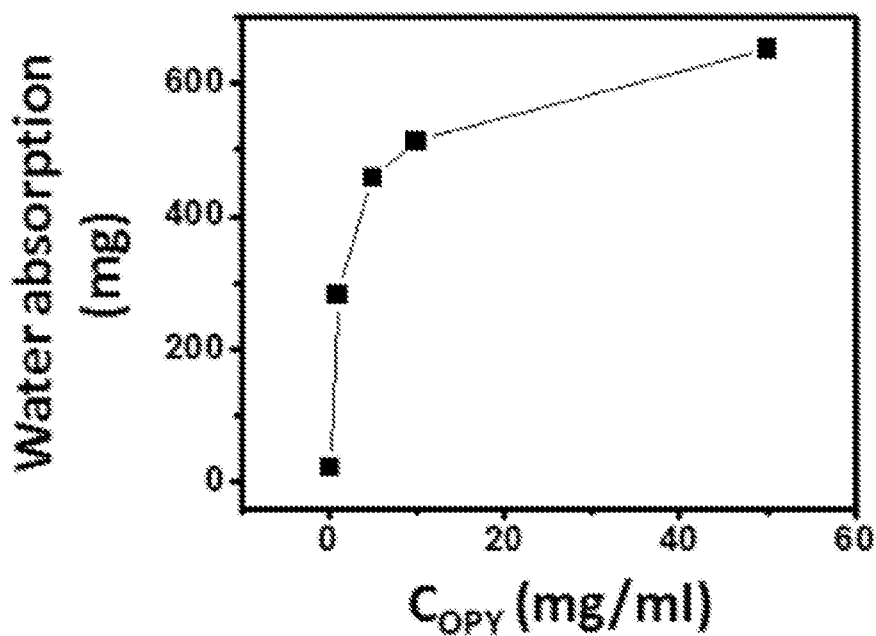
FIG. 7 includes a depiction of the moisture absorption of an exemplary harvester system at different ionic doping levels (mass of absorbed water relative to weight of the harvester system).

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The moisture harvesting networks include interpenetrating networks of hygroscopic polymers and thermoresponsive water storage polymers. Interpenetrating networks include those formed by forming one of the polymers (by polymerization) in the presence of the already-formed other polymer. The hygroscopic system absorbs moisture from the air, which is stored and selectively released by the thermoresponsive water storage system. As used herein, a moisture harvesting network can be designated a "super moisture absorbent gels," or "SMAG." The storage modulus (G') and loss modulus (G") values can be used to determine if a network includes interpenetrating polymers. For instance, the interpenetrating networks disclosed herein will have lower G', lower G", or both lower G' and G" values than either the pure hygroscopic polymer, pure thermoresponsive water storage polymer, or simple mixtures of hygroscopic polymer and thermoresponsive water storage polymer. A simple mixture refers to the combination of two separately formed polymers. In certain embodiments, the storage modulus of the interpenetrating network will be less than the storage modulus of a simple mixture of the same polymers, in the same amounts. For instance, the storage modulus of the interpenetrating network can be 10% less, 25% less, 50% less, or 75% less than the storage modulus of the equivalent simple mixture of the same polymers. In certain embodiments, the loss modulus of the interpenetrating network will be less than the loss modulus of a simple mixture of the same polymers, in the same amounts. For instance, the loss modulus of the interpenetrating network can be 10% less, 25% less, 50% less, or 75% less than the loss modulus of the equivalent simple mixture of the same polymers.

Hygroscopic polymer systems include those capable of extracting water from the atmosphere. Hygroscopic polymers include those that can absorb at least 50%, at least 100%, at least 150%, at least 200%, at least 250%, at least 300%, at least 350%, at least 400%, at least 450%, at least 500%, at least 550%, at least 600%, at least 650%, at least 700%, at least 750%, at least 800%, at least 850%, at least 900%, at least 950%, or at least 1000% by weight of water, relative to the dry weight of the polymer. Hygroscopic polymers include those having a mass average molar mass of less than 500,000, less than 450,000, less than 400,000, less than 350,000, less than 300,000, less than 250,000, less than 200,000, less than 175,000, less than 150,000, less than 125,000, less than 100,000, less than 75,000, or less than 50,000. Exemplary hygroscopic polymers include polyesters, polycarbonates, poly(meth)acrylates, polyacrylonitriles (e.g., ABS resins), poly(meth)acylamides, polysaccharides, polyheterocycles, and polysiloxanes.

In some instances, the hygroscopic polymer can include one or more ionically charged polymers, for instance, polyacrylic acids, functionalized poly(meth)acrylates and poly(meth)acrylamides such as aminoalkyl (meth)acrylates and (meth)acrylamides. Exemplary conductive polymers include polypyrroles, polyanilines, polycarbazoles, polyindoles, polyazepines and copolymers thereof. Copolymers include polymers derived from two or more monomers including pyrroles, anilines, carbazoles, indoles, azepines, acrylic acids, functionalized (meth)acrylates and (meth)acrylamides. The copolymer can be a random copolymer, such as formed when two or more monomers are polymerized together. The copolymer can be a block copolymer, such as when individual monomers are polymerized and subsequently joined together.

In some instances, the conductive polymer can include one or more doped conductive polymers. Doped polymers include polymers that have been oxidized (p-doping) or reduced (n-doping). In some instances, conductive polymers containing basic atoms can be doped under non-redox conditions, for instance by reaction with an acid. Exemplary acids include mineral acids such as hydrochloric acid, hydrobromic acid, hydroiodic acid, sulfuric acid, nitric acid, phosphoric acid, perchloric acid, and tetrafluoroboric acid. Other acids include organic acids such as sulfonic acids (e.g., toluenesulfonic acid, camphorsulfonic acid, benzenesulfonic acid, methanesulfonic acid, and trifluorosulfonic acid), as well as carboxylic acids (e.g., trifluoroacetic acid and trichloroacetic acid). The use of such compounds leads to doped polymers including one or more anions such as chloride, bromide, iodide, sulfate, phosphate, nitrate, perchlorate, tetrafluoroborate, sulfonate, acetates, and mixtures thereof.

Doped polymers may be characterized by the number of holes per monomer. In some embodiments the doping level is at least 0.010, 0.025, 0.050, 0.075, 0.100, 0.125, 0.150, 0.175, 0.200, 0.225, 0.250, 0.275, 0.300, 0.325, 0.350, 0.375, 0.400, 0.425, 0.450, 0.475, 0.500, 0.525, 0.550, 0.575, 0.600, 0.625, 0.650, 0.675, 0.700, 0.725, 0.750, 0.775, 0.800, 0.825, 0.850, 0.875, 0.900, 0.925, 0.950, or 0.975 holes per monomer. In some embodiments, the doping level can be from 0.010-1.0; from 0.10-1.0; from 0.20-1.0; from 0.30-1.0; from 0.40-1.0; from 0.50-1.0; from 0.60-1.0; from 0.70-1.0; from 0.80-1.0; from 0.90-1.0; from 0.10-0.75; from 0.20-0.75; from 0.30-0.75; from 0.40-0.75; from 0.50-0.75; from 0.10-0.50; from 0.20-0.50; from 0.30-0.50; or from 0.40-0.50.

In certain embodiments, the hygroscopic polymer can be a poly(pyrrole), poly(aniline), a mixture thereof, or a copolymer thereof. Exemplary dopants include chloride, bromide, phosphate and tetrafluoroborate. In some embodiments, the hygroscopic polymer can have a mass average molar mass of less than 100,000, less than 90,000, less than 80,000, less than 70,000, less than 60,000, or less than 50,000. The hygroscopic polymer can have a mass average molar mass from 35,000-100,000, from 50,000-100,000, from 50,000-90,000, from 50,000-80,000, from 50,000-70,000, from 50,000-60,000, from 35,000-50,000, or from 35,000-75,000.

Thermoresponsive polymers include those which selectively retain or release water based on temperature. Such systems exhibit a volume phase transition at a certain temperature, resulting in a sudden change of the solvation state. Polymers that become less soluble (or insoluble) in water as temperature increases are characterized by a Lower Critical Solution Temperature (LCST). Thermoresponsive polymers that can be used in water harvesting systems can have an LCST from about 10-80° C., 20-70° C., 25-70° C., 30-70° C., 30-65° C., or 30-60° C.

In some instances, the thermoresponsive water storage polymer can include one or more poly(N-alkylacrylamides), poly(N,N dialkylacrylamides), poly(acrylic acids), poly(vinyl ethers), or poly(vinylcaprolactams). Thermoresponsive water storage polymers can be derived from one or more monomers including N-alkylacrylamides, N,N-dialkylacrylamides, vinyl ethers, acrylic acid, and vinylcaprolactam. The thermoresponsive water storage polymer can further include monomers such as acrylic acid and/or acrylamide. The N-alkylacrylamide can be an $N-C_1-C_4$alkylacrylamide, the N,N-dialkylacrylamide can be an $N,N-di(C_1-C_4)$alkylacrylamide. The alkyl groups in the N,N-dialkylacrylamides can be the same, or can be different. When the thermoresponsive polymer is a copolymer, it can be a random copolymer or block copolymer. Exemplary thermoresponsive storage polymers can be derived from N-alkylacrylamide and/or N,N-dialkylacrylamide monomers, and may further be derived from acrylic acid, including salts thereof, and/or acrylamide. The thermoresponsive storage polymer can be derived from one or more monomers such as methylacrylamide, ethylacrylamide, n-propylacrylamide, iso-propylacrylamide, n-butylacrylamide, iso-butylacrylamide, sec-butylacrylamide, tert-butylacrylamide, dimethylacrylamide, diethylacrylamide, di-n-propylacrylamide, di-iso-propylacrylamide, N-methyl-N-ethylacrylamide, N-methyl-N-n-propylacrylamide, N-ethyl-N-n-propylacrylamide, N-methyl-N-iso-propylacrylamide, and N-ethyl-N-iso-propylacrylamide. In some instance, the thermoresponsive polymer is derived from monomers including N-isopropylacrylamide or N,N-diethylacrylamide, and can further include monomers of acrylamide and/or acrylic acid. In certain embodiments, the thermoresponsive polymer can include block copolymers of polyethylene oxide and polypropylene oxide.

The thermoresponsive water storage polymer can be a crosslinked polymer. Crosslinked polymers can be obtained by polymerizing the monomers in the presence of one or more crosslinking monomers. Crosslinked polymers can be derived from one or more monomers having two or more vinyl groups. In some instance, the crosslinking monomer will contain two, three, four, five or six vinyl groups. Exemplary crosslinking monomers include ($C_1$-$C_{10}$alkylene) bisacrylamide, such as N,N-methylenebisacrylamide, N,N-ethylenebisacrylamide, N,N-propylenebisacrylamide, and functionalized acrylamides including mono and di-($C_3$-$C_{10}$alkenyl) acrylamide such as N-allylacrylamide or N,N-diallylacrylamide. The molar ratio of crosslinking monomers to other monomers can be from 1:10,000 to 1:100, from 1:5,000 to 1:100, from 1:2,500 to 1:100, from 1:2,000 to 1:100, from 1:1,500 to 1:100, from 1:1,000 to 1:100, from 1:750 to 1:100, from 1:500 to 1:100, from 1:250 to 1:100, from 1:5,000 to 1:500, from 1:5,000 to 1:1,000, from 1:5,000 to 1:2,500, from 1:5,000 to 1:3,000, from 1:4,000 to 1,1000, from 1:4,000 to 1:2000, from 1:7,500 to 1:2,500, or from 1:10,000 to 1:5,000.

The water harvesting networks can be characterized according to the (dry) weight ratio of the hygroscopic polymer to thermoresponsive polymer. For instance, the ratio of hygroscopic polymer to thermoresponsive water storage polymer can be from about 1:0.05-1:1, 1:0.1-1:1, 1:0.25-1:1, 1:0.50-1:1, 1:0.75-1:1, 1:0.05-1:0.75, 1:0.1-1:0.75, 1:0.25-1:0.75, 1:0.50-1:0.75, 1:0.05-1:0.50, 1:0.10-1:0.50, 1:0.25-1:0.50, or 1:0.25-1:0.75. In some instances, the weight fraction of the hygroscopic polymer can be at least 50%, at least 60%, at least 70%, at least 80%, at least 85%, at least 90%, or at least 95%, relative to the total weight of the polymer network.

The interpenetrating water harvesting networks can be prepared by polymerizing one component of the network in the presence of the already formed polymer of the other component. For instance, monomer precursors of the thermoresponsive water storage polymer can be combined with a hygroscopic polymer, and then subjected the conditions suitable to form the thermoresponsive water storage polymer. In other embodiments, monomer precursors of the hygroscopic polymer can be combined with a thermoresponsive water storage polymer, and then subjected the conditions suitable to form the hygroscopic polymer.

Because the water harvesting networks disclosed herein include thermoresponsive water storage polymers, they can be utilized without the use of electricity or other artificial energy outputs. For instance, the water harvested can be placed in a cool environment, for instance in the shade or overnight, to absorb water. The hydrated harvester can be placed in a collector and exposed to sunlight. As the sun heats the network, the thermoresponsive polymer undergoes a phase transition, releasing water into the collector. For instance, the network can be heated to a temperature of at least 30° C., at least 35° C., or at least 40° C., at which time the absorbed water will be rapidly released from the network. Generally, at least 50% of the water will be released in less than 60 minutes, less than 45 minutes, less than 30 minutes, less than 20 minutes, or less than 10 minutes when the network is heated to a temperature greater than the Lower Critical Solution Temperature (LCST) of the thermoresponsive water storage polymer.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results.

These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Figure 8:
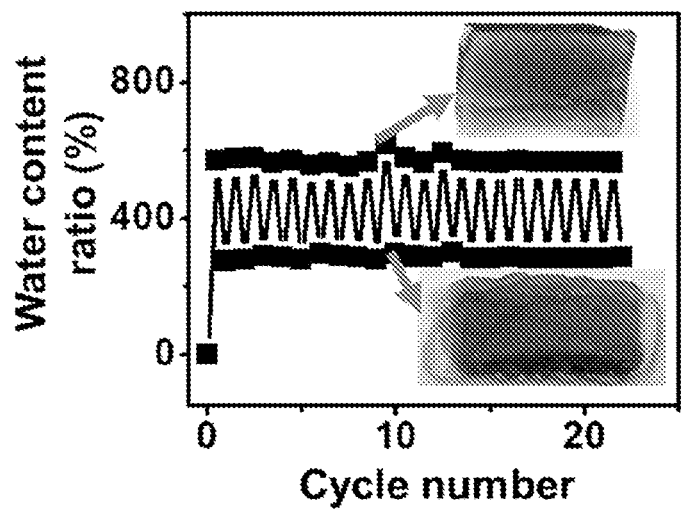
FIG. 8 includes a depiction of water absorption/release cycles for the harvester system prepared in Example 1.
Figure 9:
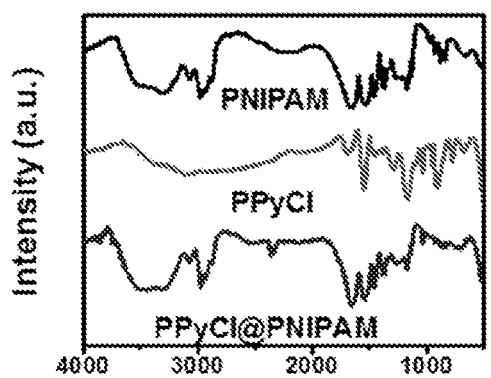
FIG. 9 depicts an FT-IR spectrum of NIPAM alone, PPyCl alone and the interpenetrating network prepared in Example 1.
Figure 10:
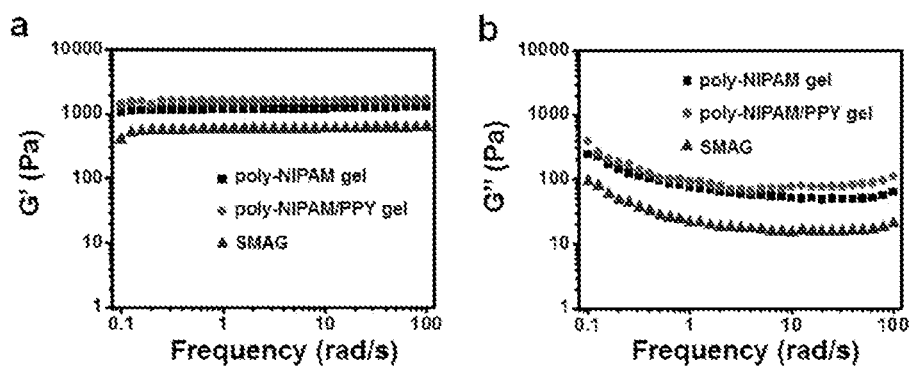
FIG. 10 depicts (a) the storage modulus (G') and (b) loss modulus (G") of poly-NIPAM gel, poly-NIPAM/PPy-Cl gel and the SMAG tested in a frequency sweep mode.

Example 1: Interpenetrating Network Formed by Polymerizing a Thermoresponsive Polymer in the Presence of a Hygroscopic Polymer Pyrrole monomer, ammonium persulfate ("APS") and LiCl (molar ratio 1:1:1) was gradually added into an aqueous HCl solution (3.7% wt). The polymerization reaction was stopped by vacuum filtering and washing. The obtained black product was dispersed in DI water by sonication. The resulting PPyCl polymer (50 µg), N-isopropylacrylamide ("NIPAM") monomers (567 mg), N, N-tetramethylenediamine (10 µl) and deionized water (10 mL) were mixed together and purged with nitrogen for ten minutes, followed by centrifugation for five min with a speed of 7000 rpm. Then N',N'-methylenebisacrylamide (0.3 mg) and APS (0.56 mg) were added into the solution. The polymerization was carried out for 12 h. The obtained hydrogel was immersed into DI water overnight to remove unreacted monomers. As shown in FIG. 8, the resulting material showed good water absorbing/releasing properties over multiple cycles. FIG. 9 depicts an FT-IR spectrum of NIPAM alone, PPyCl alone and the interpenetrating network.

Example 2: Interpenetrating Network Formed by Polymerizing a Hygroscopic Polymer in the Presence of a Thermoresponsive Polymer N-isopropylacrylamide monomers (567 mg), N, N-tetramethylenediamine (10 µL) acting as accelerator and deionized (DI) water (10 mL) were mixed together and purged with nitrogen for 10 min (Solution E). The bubbles in the solution E was removed by centrifugation for 5 min at a speed of 7000 rpm. Then the N', N'-methylenebisacrylamide and solution (100 µL, 30 mg/mL) acting as the cross linker and ammonium persulfate solution (APS, 50 µL 228 mg/mL) acting as the initiator were added into 1 mL solution E under sonication. The polymerization was carried out for 12 h. The obtained poly-NIPAM hydrogel was immersed into hot DI water (ca. 80° C.) for 12 h to remove unreacted monomers.

Poly-NIPAM hydrogel (ca. 1 cm$^3$) was immersed in hot DI water (80° C.) to be completely shrunk and then transferred into pyrrole solution (volume ratio of pyrrole and water is 1:10) overnight. The swollen hydrogel was washed with DI water. Then, the poly-NIPAM/Py hydrogel was immersed into a solution of ammonium persulfate (228 mg), lithium chloride (127 mg), 37% hydrochloride (85 uL) and 10 mL DI water. The hybrid gel was formed overnight by in situ polymerization within the poly-NIPAM hydrogel. Finally, the obtained poly-NIPAM/PPy-Cl was immersed into hot DI water (ca. 80° C.) for 3 h to remove unreacted monomers. The purification step was repeated 3 times.

The G' and G" values of pure poly-NIPAM gel, poly-NIPAM/PPy-Cl gel and SMAG are shown in FIG. S2. Their gel states are revealed by the wide linear viscoelastic region in the dynamic frequency sweep experiments and further confirmed by the fact that the value of storage modulus is higher than that of the loss modulus in each case. The poly-NIPAM/PPy-Cl gel sample shows identical G' and G" values with those of pure poly-NIPAM gel, which is attributed to the similar skeleton structure brought by the continuous and flexible polymeric network of the poly-NIPAM. On the contrary, the G' and G" values of SMAG are significantly lower than that of the poly-NIPAM/PPy-Cl gel, indicating a weakened skeleton. Moreover, the G" of SMAG and all the control samples based on poly-NIPAM show identical trend (e.g. inflection point at ~50 Hz), indicating that the framework of SMAG was established by the poly-NIPAM network.

Example 3: Water Harvesting Evaluation

The RH can be stabilized to a required value by a certain super-saturated salt solution. To evaluate the hygroscopicity, the obtained samples were attached in the nylon mesh bag, which was suspended above the super-saturated salt solution in an enclosed container (without air convection) at a temperature of 25° C. (achieved by constant temperature oven) to create required RH level. Additionally, since the RH is related to the air pressure, a needle was used to connect internal space and atmosphere, maintaining an ambient air pressure. A series of RH can be achieved by specially selected salts.

| Salt | RH (%) |
| --- | --- |
| NaOH | 7 |
| LiCl | 11 |
| MgCl | 30 |
| K$_2$CO$_3$ | 43 |
| NaBr | 60 |
| NaCl | 75 |
| KCl | 90 |
| K$_2$SO$_4$ | 98 |

Figure 11:
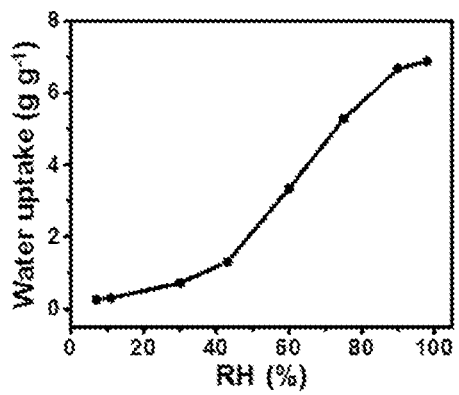
FIG. 11 depicts the water absorption isotherms of SMAG networks at different relative humidities.
Figure 12:
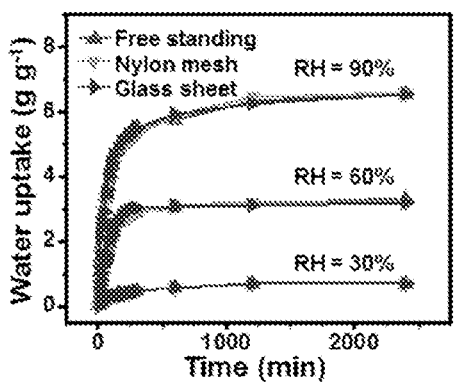
FIG. 12 depicts the moisture capturing behavior of free-standing SMAG networks, and SMAG networks pinned to either meshed nylon or glass sheets.
Figure 13:
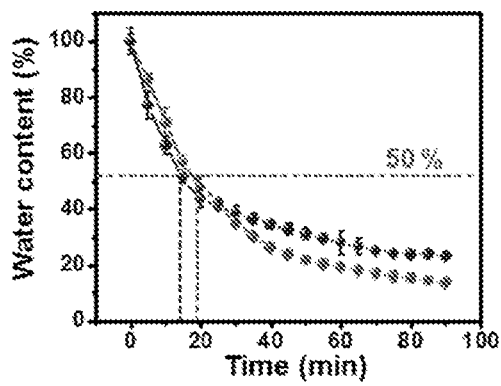
FIG. 13 depicts the moisture releasing behavior of SMAG networks with differing water content under 1 kW/m$^2$ solar irradiation.

The network prepared in Example 2 was cut into sheets with thickness of ~5 mm were cut into small pieces with area of 1 cm$^2$. The obtained tablets were completely dried in vacuum oven at 100° C. The dried network (50 g) was bagged by meshed nylon and exposed to moisture air at certain relative humidity (RH). After that the hydrated tablets were heated by the solar radiation (1 kW m$^{-2}$) to release the containing water in a closed transparent container. The volume of collected water was directly measured by a graduated cylinder. For a typical AWH cycle at RH of 60% and 90%, the time of water capturing and releasing were 50 min and 10 min, respectively. For a typical AWH cycle at RH of 30%, the time of water capturing and releasing were 280 min and 80 min, respectively. FIG. 11 depicts the water absorption isotherms of SMAG networks at different relative humidities.

Example 4: Atmospheric Water Harvesting (AWG)

Figure 14:
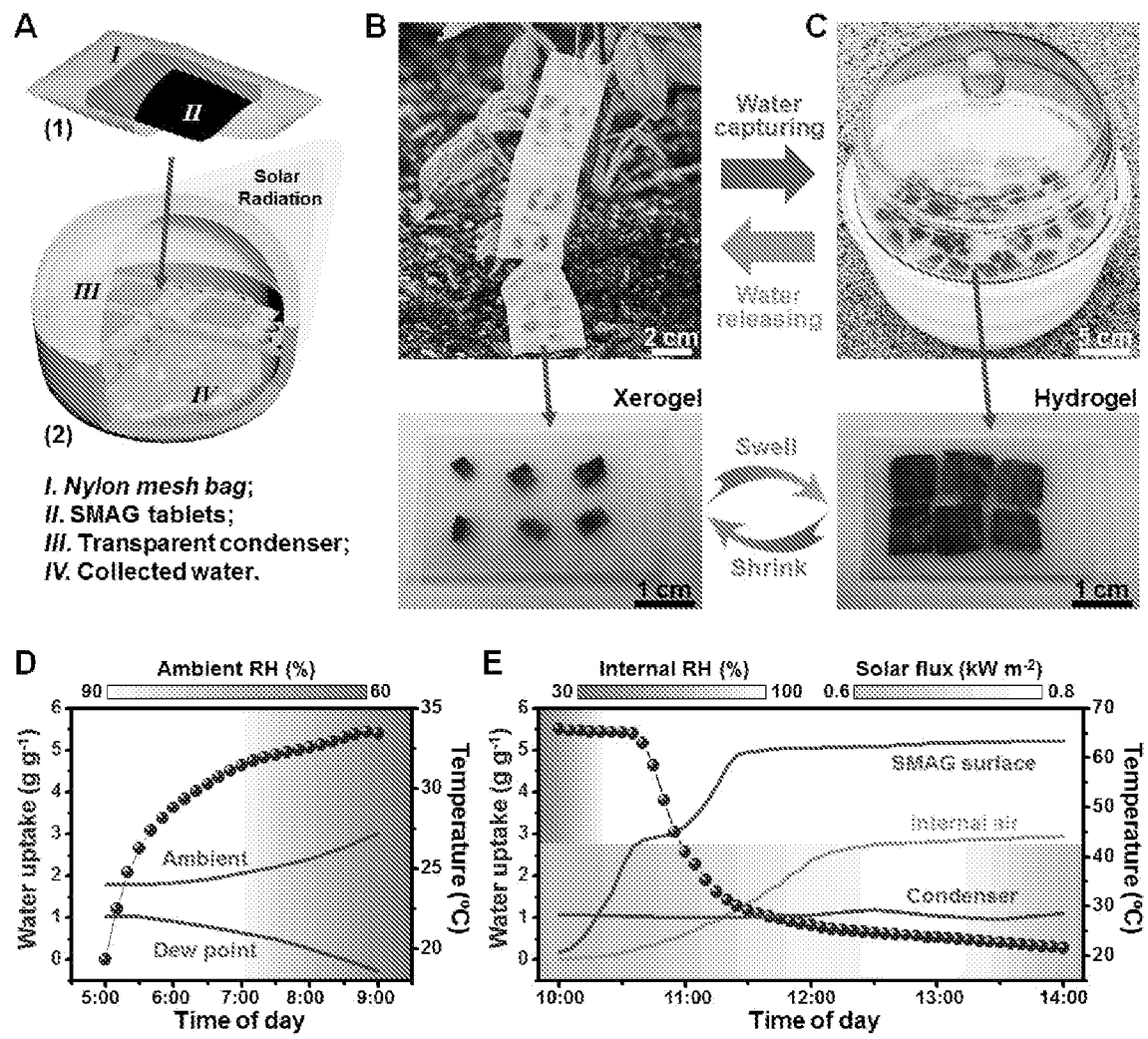
FIG. 14 depicts outdoor AWH powered by natural sunlight. A, Schematic illustration of (1) the water harvester based on SMAGs for (2) the water collector. B and C, Photograph of SMAG bags during (B) water capturing in natural environment and (C) water releasing under solar radiation. The obvious volume change of SMAGs indicates a large water yield. D, Representative outdoor water capturing process in the early morning, where ambient temperature, dew point temperature and ambient RH were presented. E, Representative outdoor water releasing process in noontime, where the surficial temperature of SMAG (red curve), condenser temperature, internal air temperature, internal RH and solar flux were presented.

Small SMAG tablets (FIG. 14A) were packaged in transparent nylon mesh bags (FIGS. 14A I and II), which were exposed to air for water capturing and placed on the upper layer of a closed container for water releasing, demonstrating a scalable, potentially low-cost atmospheric water harvester. The solar vaporized water (i.e. normal mode) was condensed on the transparent condenser (FIG. 14A III) and flowed to the bottom, converging with the directly released water upon the express mode (FIG. 14A IV). As shown in FIGS. 14 B and C, upon exposure to the moist air, the original dry SMAG bags display a visible swelling after several hours, indicating that the moisture can be captured by the SMAGs. The subsequent water releasing of swollen SMAGs was processed by placing the container under natural sunlight.

The AWH experiment was carried out from 5:00 a.m. (ca. 1 hour before sunrise) to 9:00 a.m. under a sunshade, where the ambient temperature, RH and dew point temperature were traced (FIG. 14D). In the early-morning, the RH was around 85%, indicating an ideal environment for rapid water harvesting. However, the comparison of ambient temperature (FIG. 14D) and dew point temperature (FIG. 14D) eliminated the possibility of spontaneous water condensation. Upon exposure to the ambient, the water uptake of SMAG tablets can be increased to 5.4 g g$^{-1}$ in four hours with an average water capturing rate of ca. 1.3 g g$^{-1}$ h$^{-1}$. Subsequently, the hydrated SMAGs were retrieved and exposed to the sunlight (ca. 0.7 kW m$^{-2}$) from 10:00 a.m. to 2:00 p.m. (FIG. 14E). The water adsorbed at the surface of SMAG tablets can be evaporated by the solar heating, increasing the internal RH of the container (to a saturated state). When the SMAGs were heated to ca. 40° C., its surface temperature variation was slowed down (FIG. 14E), indicating a stimulated water releasing in the express mode. The quantitative monitoring of water uptake (FIG. 14E) further confirmed a major water release of 3.9 g g$^{-1}$ from 10:40 to 11:20. After that, the surface temperature of SMAG gradually increased to ca. 63° C., which was an equilibrium temperature upon evaporation cooling and solar heating due to the water release in the normal mode. It still contributed to a continuous water release (ca. 0.4 g g$^{-1}$ h$^{-1}$) after 11:20. Moreover, the condenser maintained a low temperature (FIG. 14E), enabling a steady condensation of vaporized water. The internal air temperature went beyond 40° C. after 12:00 a.m. (FIG. 14E), suggesting that the main water releasing process was finished. It was worth noting that, although the environmental RH is fluctuant and the natural sunlight is relatively weak compared with most of drought regions around the world, the SMAG presents efficient water production. These results indicate that the SMAGs enables a flexible AWH adapting to the varying environment, revealing its potential for practical applications.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A water harvesting material comprising an interpenetrating network comprising:
    a) a hygroscopic polymer; and
    b) a thermoresponsive water storage polymer,
    wherein the hygroscopic polymer comprises a conductive polymer, wherein the conductive polymer is a polypyrrole.

2. The water harvesting material of claim 1, wherein the polypyrrole is doped polypyrrole.

3. The water harvesting material of claim 2, wherein the doping level is at least 0.300 holes per monomer.

4. The water harvesting material of claim 1, wherein the hygroscopic polymer has a Mw less than about 300,000.

5. The water harvesting material of claim 1, wherein the thermoresponsive water storage polymer is characterized by a Lower Critical Solution Temperature between about 30-70° C.

6. The water harvesting material of claim 1, wherein the thermoresponsive water storage polymer comprises a poly(N-alkylacrylamide), poly(N,N dialkylacrylamide), poly(acrylic acid), poly(vinyl ether), poly(vinylcaprolactam), or a mixture thereof.

7. The water harvesting material of claim 1, wherein the thermoresponsive water storage polymer comprises a poly(N-alkylacrylamide), a poly(N,N-dialkylacrylamide), or a mixture thereof.

8. The water harvesting material of claim 7, wherein the thermoresponsive water storage polymer further comprises a poly(acrylic acid).

9. The water harvesting material of claim 1, wherein the thermoresponsive water storage polymer is further derived from at least one crosslinking monomer.

10. The water harvesting material of claim 9, wherein the crosslinking monomer comprises ($C_1$-$C_{10}$alkylene) bisacrylamides, mono-($C_3$-$C_{10}$alkenyl)acrylamides, di-($C_3$-$C_{10}$alkenyl)acrylamides, or a mixture thereof.

11. The water harvesting material of claim 1, wherein the ratio of hygroscopic polymer to thermoresponsive water storage polymer is from about 1:0.05-1:1.

12. A method of harvesting atmospheric water comprising:
    a) exposing the water harvesting material of claim 1 to atmospheric moisture for a time sufficient to absorb atmospheric moisture;
    b) heating the network to a temperature sufficient to desorb the water from the network; and
    c) collecting the desorbed water.

13. A method of preparing a water harvesting network comprising forming an interpenetrating network comprising a hygroscopic polymer; and a thermoresponsive water storage polymer, comprising the step:

a) forming the hygroscopic polymer in the presence of the thermoresponsive water storage polymer; or
b) forming the thermoresponsive water storage polymer in the presence of the hygroscopic polymer, wherein the hygroscopic polymer comprises a conductive polymer, where the conductive polymer is a polypyrrole.

14. The method of claim 13, comprising forming the hygroscopic polymer in the presence of a poly(N-alkylacrylamide), poly(N,N dialkylacrylamide), poly(acrylic acid), poly(vinyl ether), poly(vinylcaprolactam), or a mixture thereof.

15. The method of claim 13, comprising polymerizing a monomer mixture comprising pyrrole in the presence of the thermoresponsive polymer.

16. The method of claim 13, comprising forming the thermoresponsive polymer in the presence of a polypyrrole.

17. The method of claim 16, comprising polymerizing a monomer mixture comprising methylacrylamide, ethylacrylamide, n-propylacrylamide, iso-propylacrylamide, n-butylacrylamide, iso-butylacrylamide, sec-butylacrylamide, tert-butylacrylamide, dimethylacrylamide, diethylacrylamide, di-n-propylacrylamide, di-iso-propylacrylamide, N-methyl-N-ethylacrylamide, N-methyl-N-n-propylacrylamide, N-ethyl-N-n-propylacrylamide, N-methyl-N-iso-propylacrylamide, N-ethyl-N-iso-propylacrylamide, or a mixture thereof in the presence of polypyrrole.

18. A water harvesting material prepared by the process of claim 13.

* * * * *